(12) United States Patent
Baars et al.

(10) Patent No.: US 8,327,696 B2
(45) Date of Patent: Dec. 11, 2012

(54) MONITORING OF A PARTICLE LIMIT VALUE IN THE EXHAUST GAS OF AN INTERNAL COMBUSTION ENGINE

(75) Inventors: Enno Baars, Leonberg (DE); Torsten Handler, Stuttgart (DE); Bernhard Kamp, Ludwigsburg (DE); Henrik Schittenhelm, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 411 days.

(21) Appl. No.: 12/689,582

(22) Filed: Jan. 19, 2010

(65) Prior Publication Data

US 2010/0180669 A1   Jul. 22, 2010

(30) Foreign Application Priority Data

Jan. 19, 2009 (DE) .......................... 10 2009 000 286

(51) Int. Cl.
*G01M 15/10* (2006.01)
(52) U.S. Cl. .................................................. 73/114.69
(58) Field of Classification Search ............... 73/114.69, 73/114.71, 114.74, 114.75, 114.76, 114.77
See application file for complete search history.

(56) References Cited

U.S. PATENT DOCUMENTS

| | | | |
|---|---|---|---|
| 5,110,747 A * | 5/1992 | Pataschnick et al. | ......... 436/133 |
| 7,377,154 B2 | 5/2008 | Berger et al. | |
| 7,568,376 B2 | 8/2009 | Strohmaier et al. | |
| 8,127,592 B2 * | 3/2012 | Konstandopoulos | ........ 73/28.03 |

FOREIGN PATENT DOCUMENTS

| | | |
|---|---|---|
| DE | 10 2005 034 247 | 1/2007 |
| DE | 10 2006 018 956 | 10/2007 |

* cited by examiner

*Primary Examiner* — Eric S McCall
(74) *Attorney, Agent, or Firm* — Merchant & Gould P.C.

(57) ABSTRACT

The invention relates to a method for diagnosing a particle filter used for filtering particles out of the exhaust gas of an internal combustion engine, wherein a collecting particle sensor is disposed downstream of the particle filter in the direction of flow of the exhaust gas and wherein a measurement for the loading of the particle sensor is determined from an output signal of the particle sensor. Provision is thereby made for the temporal integral of a parameter correlating to the particle emissions of the internal combustion engine to be formed during a measurement cycle, for the measurement for the loading of the particle sensor to be associated with the integral at least one measurement point in time during the measurement cycle and for a defective particle filter to be suggested if the measurement for the loading of the particle sensor is higher than a loading threshold value associated with the integral or if the integral is lower than an integral threshold value associated with the measurement for the loading of the particle sensor. The invention further relates to a device for carrying out the method. The method and the device allow for the diagnosis of the functionality of a particle filter in the exhaust gas of an internal combustion engine during any operating conditions passed through by the internal combustion engine.

12 Claims, 1 Drawing Sheet

MONITORING OF A PARTICLE LIMIT VALUE IN THE EXHAUST GAS OF AN INTERNAL COMBUSTION ENGINE

This application claims benefit of Ser. No. 10 2009 000 286.3, filed 19 Jan. 2009 in Germany and which application is incorporated herein by reference. To the extent appropriate, a claim of priority is made to the above disclosed application.

BACKGROUND

The invention relates to a method for diagnosing a particle filter used for filtering particles from the exhaust gas of an internal combustion engine, wherein a collecting particle sensor is disposed in the direction of flow of the exhaust gas and wherein a measurement for the loading of the particle sensor is determined from an output signal of the particle sensor.

The invention further relates to a device for diagnosing a particle filter used for filtering particles from the exhaust gas of an internal combustion engine having a collecting particle sensor downstream of the particle sensor in the direction of flow of the exhaust gas and having a control electronics for evaluating an output signal of the particle sensor and for forming a measurement for the loading of the particle sensor from the output signal of the particle sensor.

A method for monitoring an exhaust gas limit value of an internal combustion engine by means of an engine control is described in the patent application DE 102005034247 A1, wherein the engine control has at least one exhaust gas sensor and an error signal is emitted when the exhaust gas limit value is exceeded. The emissions are thereby ascertained for the present driving condition with the aid of an engine model and are compared with the signal of the exhaust gas sensor or a comparison value for the emissions, which is derived from said signal. The particle sensor can be a collecting particle sensor. The method makes the exhaust gas monitoring of deviating operating conditions of the internal combustion engine possible when the driving cycles, for which the exhaust gas limit values are defined, are standardized in relation to each other.

The German patent DE 102006018956 A1 describes a method for determining a mass of particles or a particle mass flow in an exhaust gas tract of an internal combustion engine, wherein at least one resistive particle sensor, whose measured signal change is compared with a predicted signal change ascertained from an engine model, is disposed in the exhaust gas tract of the internal combustion engine. In so doing, provision is made for the measured signal change of the particle sensor and/or the predicted signal change of the particle sensor to be corrected while taking into account the influencing variables on the cross sensitivities of the particle sensor.

The methods make it possible to distinguish between a defective particle filter and one that is still to be considered as intact. The disadvantage thereby is that both methods require a large use of software in the engine control unit, in particular when using a particle untreated emissions model.

It is therefore the task of the invention to provide a device and a method, which make a simplified diagnosis of the particle filter with a reduced application input of software possible.

SUMMARY

The task of the invention relating to the method is solved by virtue of the fact that the temporal integral of a parameter, which correlates to the particle emissions of the internal combustion engine, is formed during a measurement cycle, by virtue of the fact that the measurement for the loading of the particle sensor is associated with said integral at least one measurement point in time during the measurement cycle and by virtue of the fact that a defective particle filter is suggested if the measurement for the loading of the particle sensor is higher than a loading threshold value associated with said integral or if said integral is lower than an integral threshold value associated with the measurement for the loading of the particle sensor.

The acquisition and integration of a parameter, which correlates at least roughly to the particle emissions, are to constitute a significantly more reduced application input of software in relation to an engine model for calculating the particle emissions. In so doing, various suitable parameters of the engine electronics are already available for the control of the internal combustion engine in the form of measured values.

The evaluation, whether a particle figure still has a sufficient filtering effect or not, takes place by using a comparative examination: if the increase in the output signal of the particle sensor or in a variable derived from said signal as a measurement for the loading of the particle sensor and consequently of the particle content actually present in the exhaust gas stream downstream of the particle filter proceeds faster than the increase, which is expected using the course of the integral of the parameter correlating to the particle emissions of the internal combustion engine, a defective particle filter is then indicated. This can be simply checked if a maximally admissible loading threshold value of the particle sensor is associated with a respective integral value. Provision can be made for any number of points in time or for a predetermined point in time during the measurement cycle to be checked.

Conversely a comparative examination can be made to determine whether the integral increases more slowly than the increase to be expected on the basis of the course of the output signal, which likewise suggests a defective particle filter. In this instance, the check can take place by virtue of the fact that an at least achievable value of the integral of the parameter correlating to the particle emissions of the internal combustion engine is associated with a measured output signal of the particle sensor, respectively a variable derived from it. If this predetermined integral threshold value is not achieved, a defective particle filter is suggested. Also in this case, provision can be made for any number of points in time or for a predetermined point in time during the measurement cycle to be checked.

The formation of the integral as well as the measurement of the loading of the particle sensor can take place during any operating cycle, which the internal combustion engine passes through. The implementation of the method is therefore not bound to operating cycles, which, for example, are specified by law, for the evaluation of the functional capability of particle filters.

A simple evaluation at in each case one point in time during a measurement cycle is made possible by virtue of the fact that the measurement point in time for associating the measurement for the loading of the particle sensor with the integral is defined if the measurement for the loading of the particle sensor achieves a predetermined first limit value or if the integral achieves a predetermined second limit value.

The check to determine whether the first limit value is achieved establishes the measurement point in time based on the loading of the particle sensor and consequently the particle flow in the exhaust gas of the internal combustion engine, which was actually measured. The measurement point in time can thereby be selected in such a way that a sufficient quantity of particles have collected on the particle sensor so that a sufficiently accurate evaluation of the output signal of the particle sensor is possible The check to determine whether the second limit value is achieved establishes in contrast the measurement point in time based on the course of the integral versus the parameter correlating to the particle emissions of the internal combustion engine.

The first limit value is preferably defined at a value, whereat an output signal of the collecting particle sensor achieves a minimum triggering threshold of the particle sensor. Depending on the evaluation method of the particle sensor, the minimum triggering threshold can be a predefined current limit or a resistance limit of the particle sensor. If the particle sensor is evaluated via an AC voltage measurement, provision can thus be made for the exceeding or falling below of a limit value in the capacitance, of a complex impedance or of the real part or the imaginary part of the complex impedance of the particle sensor to be the minimum triggering threshold. The minimum triggering threshold is usually set at an earliest possible point in time within a measurement cycle, whereat the output signal of the particle sensor assuredly is in contrast to interferences on it and thus assures a fast and certain activation of the method.

Corresponding to an alternative variation of the embodiment of the invention, provision can be made for the second limit value to be defined at a value, whereat a sufficient quantity of particles for the evaluation of the particle sensor is collected on said sensor when the particle filter is in a borderline condition. A smaller second limit value for a particle filter, which is damaged to the point of being in a borderline condition, still lies in a range, wherein the output signal of the particle sensor can not definitely be distinguished from interferences.

Provision can therefore further be made for the second limit value to be defined at a value, whereat the minimum triggering threshold is achieved when the condition of the particle filter is borderline. This is the first point in time within a measurement cycle, whereat an output signal of the particle sensor is present, which is clearly distinguishable from interferences and whereat a defective particle filter can be detected. A larger second limit value allows for the method to be carried out; however, the evaluation does not take place at the earliest possible point in time during a measurement cycle.

An additional possible evaluation can furthermore take place by a first ratio being formed from the measurement for the loading of the particle sensor and the integral of the parameter and by a defective particle filter being suggested when a first ratio threshold is exceeded or by a second ratio being formed from the integral of the parameter and the measurement for the loading of the particle sensor and by a defective particle filter being suggested when a second ratio threshold is undershot. The first ratio threshold and the second ratio threshold can thereby (for example when the measurement for the loading of the particle sensor is suitably processed) be uniformly specified over the entire measurement cycle after the minimum triggering threshold has been achieved or be specified as a function of the current integral value or of the current measurement for the loading of the particle sensor.

When the particle loading of a collecting particle sensor exceeds a certain quantity range, the output signal of the particle sensor goes into saturation. In the case of collecting particle sensors, the particles adhering to their surfaces are therefore removed interval-wise by means of burning-free. The point in time of the burning-free can result according to a predetermined measurement period or as a function of the measured amount for the loading of the particle sensor. If provision is made for the beginning of the measurement cycle to be linked to a burning-free of the particle sensor, the integration of the parameter correlating to the particle emissions of the internal combustion engine thus begins at a defined point in time and can be compared with the course of the measurement for the particle loading. The integration preferably begins with the conclusion of the burning-free phase and hence at the same time as the collecting phase of the particle sensor.

The method is based on integration of a parameter, which at least roughly correlates to the particle emissions of the internal combustion engine. For that reason, provision can be made for a driven distance ascertained from a driving speed or an exhaust gas heat quantity ascertained from an exhaust gas heat flow or an oxygen quantity ascertained from an oxygen mass flow transferred during the combustion process or a fuel quantity ascertained from an injection quantity per unit of time or the work performed ascertained from the power output of the internal combustion engine to be used as the temporal integral. Provision can also be made for the integral or the average/mean value of a variable dependent on the load and the rotational speed of the internal combustion engine to be used as the temporal integral or for at least two integrals from at least two of the previously mentioned variables to be used for diagnosing the particle filter. The mean or average value of the variable dependent on the load or the engine rotational speed thereby serves as a default value for the temporal integral. All of these parameters correlate more or less to the particle emissions of the internal combustion engine and are already in part available to the engine control of the internal combustion engine as data in modern internal combustion engines. In order to increase the evaluation reliability, it is possible to take into account the integrals of a plurality of the parameters vis-á-vis the measurement for the loading of the particle sensor.

The evaluation reliability of the method can furthermore be increased by virtue of the fact that a defective particle filter is suggested if a defective particle filter was diagnosed in at least two consecutive measurement cycles.

The proper functioning of a particle filter is defined on the basis of maximally admissible particle emissions during predetermined, consecutive operating phases of the internal combustion engine. A driving cycle, respectively load/rpm cycle, specified by law is run through on a roller type test stand, respectively an engine test bench, for a motor vehicle powered by the internal combustion engine; and the particle emissions are measured. The specifications for the particle emissions are met when the particle filter is intact. When the particle filter is defective, the particle emissions exceed the maximally admissible emissions value. A particle filter, which is damaged to the point of being in a borderline condition, is present if the specified maximum value for the particle emissions is just met during the driving cycle, respectively load/rpm cycle, specified by law. The calibration of the system required for implementing the method can therefore result by virtue of the fact that the establishment of the loading threshold value or the integral threshold value or the first ratio threshold or the second ratio threshold occurs during an operation of the internal combustion engine with a particle filter, which is damaged to the point of being in a borderline condition. In so doing, the internal combustion engine is preferably operated according to the driving cycle specified by law or according to the load/rpm cycle specified by law. For the sake of practical application, it is advantageous to use a particle filter during calibration, which has somewhat less damage than would be necessary to exactly meet the maximum admissible specifications of the law, in order to assure an appropriate safety margin in the later diagnosis of the particle filter.

The task of the invention relating to the device is solved as a result of an integral former for the formation of a temporal integral of a parameter correlating to the particle emissions of the internal combustion engine being provided in the control electronics, as a result of software for comparing the measurement for the loading of the particle filter with a loading threshold value, which is defined as a function of the present integral, being provided in the control electronics or as a result of software for comparing the integral with an integral threshold value, which is defined as a function of the measurement for the loading of the particle filter, being provided in the control electronics.

The integral thereby forms a default variable for an expected particle emissions corresponding to the operating cycle of the internal combustion engine which was passed through, said engine having an assumed borderline particle filter. If the actual particle emissions measured with the aid of the particle sensor are smaller, an intact particle filter is present. On the other hand, if the actual particle emissions measured with the aid of the particle sensor are larger, a defective particle filter can be assumed.

The software application input for forming the integral and for comparing the integral with the measurement for the loading of the particle filter as a parameter for the actual particle emissions is especially low in comparison with the calculation of expected particle emissions from an engine model. The implementation can take place in the existing control electronics.

The integral former calculates the temporal integral of a parameter correlating at least roughly to the particle emissions of the internal combustion engine. For this reason, provision can be made for a driving speed or an exhaust gas heat flow or an oxygen heat flow momentarily transferred due to the combustion process or a fuel quantity injected per unit of time or a power output yielded by the internal combustion engine or a variable dependent on the load and the rotational speed of the internal combustion engine to be supplied to the control electronics for forming the integral. All of the parameters correlate to the particle emissions of the internal combustion engine and are in part already present in modern internal combustion engines as data or as parameters, which can be calculated from present measured values.

BRIEF DESCRIPTION OF THE DRAWINGS

The invention is explained below with the aid of one example of embodiment depicted in the figures. The following are shown.

DETAILED DESCRIPTION

Figure 1:
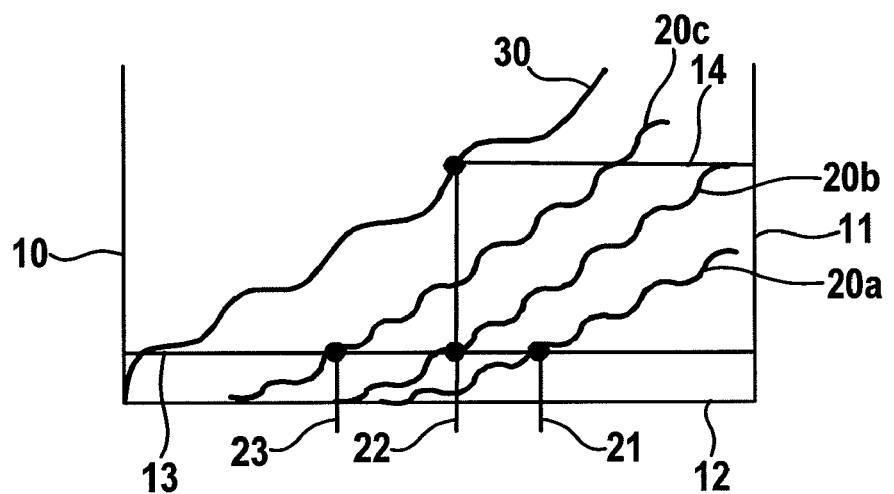
FIG. 1 is the temporal course of an integral versus the exhaust gas heat flow of an internal combustion engine and output signals of a collecting particle sensor.
Figure 2:
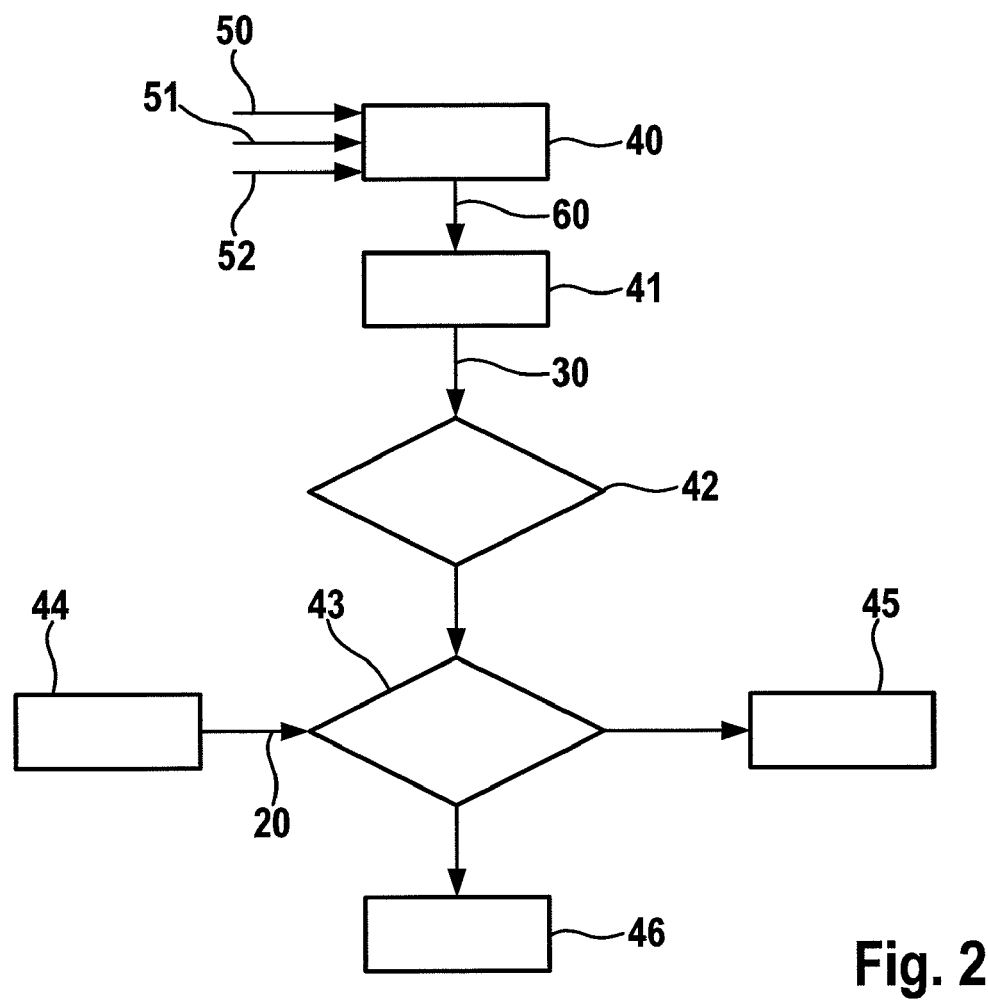
FIG. 2 is a flow diagram for diagnosing a particle filter.

FIG. 1 shows the temporal course of an integral 30 versus an exhaust gas heat flow 60 of an internal combustion engine, which is depicted in FIG. 2, and output signals 20a, 20b, 20c of a collecting particle sensor 44 with the output signal 20 depicted in FIG. 2. In so doing, the particle sensor 44 is disposed in the direction of flow of the exhaust gas downstream of a particle filter in the exhaust gas of the internal combustion engine. In the example of embodiment shown, the particle sensor 44 is constituted by a resistive particle sensor, whose output signal 20 constitutes a measurement for the loading of the particle sensor 44.

A flow axis 10 and an exhaust gas heat quantity 11 are depicted versus a time axis 12. The output signals 20a, 20b, 20c of the particle sensor 44 apply to the flow axis 10; the integral 30 versus the exhaust gas heat flow 60 applies to the axis of the exhaust gas heat quantity 11.

A minimum triggering threshold 13 is designated with reference to the flow axis 10. A second limit value 14 applies to the axis of the heat quantity 11.

A first minimum triggering point in time 21 and a second minimum triggering point in time 23 are defined at the intersection points of the designation for the minimum triggering threshold 13 with the output signals 20a, 20c of the particle filter 44. A measurement point in time 22 occurs at the intersection point of the integral 30 with the second limit value 14. The designation for the minimum triggering threshold 13 likewise cuts the curve of the second output signal 20b at this measurement point in time 22.

The first output signal 20a shows the course of the output signal 20 of the particle sensor 44 depicted in FIG. 2 if said sensor 44 is operated downstream of an intact particle filter 44. If the particle sensor 44 is operated in an exhaust gas after-treatment system, which is damaged to the point of being in a borderline condition, in particular downstream of a borderline particle filter 44, the course of the second output signal 20b arises as a result. A particle filter 44, which is considered to be borderline, is thereby a particle filter 44, with which the limit value for the particle discharge of the internal combustion engine, which is required by law, is still just met during a mandatory driving cycle, respectively load/rpm cycle, of the internal combustion engine or a motor vehicle powered by the internal combustion engine. It is advantageous for the depicted method if the second output signal 20b is obtained downstream of a particle filter 44, which is somewhat less damaged than the borderline filter mentioned above, in order to obtain a corresponding safety margin during the diagnosis of the particle filter 44. The third output signal 20c is obtained if the particle filter 44 is operated downstream of a defective particle filter 44.

The integral 30 is configured to an exhaust gas heat quantity during the operation of the internal combustion engine by a temporal integration of the exhaust gas heat flow 60 in the exhaust gas tract of the internal combustion engine. The temporal course of the integral 30 as well as the course of the output signals 20a, 20b, 20c is dependent on the operating conditions of the internal combustion engine.

The output signal 20 of the particle sensor 44 results from the particle flow carried along in the exhaust gas of the internal combustion engine. In so doing, a large particle flow, as is the case downstream of a defective particle filter, causes a rapid increase in the output signal 20 corresponding to the third output signal 20c, whereas a smaller particle flow results in a slow and time-delayed increase in the output signal 20 corresponding to the first output signal 20a.

A measurement cycle begins after a burning-free phase of the particle sensor 44, whereat the particles collected on the particle sensor 44 are burned as a result of a temperature increase in the particle sensor 44. During the collecting phase subsequent to the burning-free phase, there is initially no evaluable output signal 20 present at the depicted resistive particle sensor 44. Only after a certain particle loading of the particle sensor 44 does the output signal 20 measurably increase. The minimum triggering threshold 13 denotes an output signal 13 and hence a defined particle loading of the particle sensor 44, which can assuredly be evaluated distinguishable from interferences. The point in time, whereat the output signal 20 of the particle sensor 44 achieves the minimum triggering threshold 13, can therefore be used to determine the particle mass flow carried along in the exhaust gas. The first output signal 20a, which is obtained downstream of an intact particle filter, results then in a first minimum triggering point in time 21 being situated very late, whereas the third output signal 20c downstream of a defective particle filter achieves the minimum triggering threshold 13 at a second minimum triggering point 23, which is situated significantly earlier.

The aim of the method is to make a check of the functionality of the particle filter, which is required by law, possible during any operating conditions of the internal combustion engine. For that purpose, the temporal course of the output signal 20 of the particle filter 44 must be evaluated as a function of the operating states, which are passed through, and of the untreated particle emissions of the internal combustion engine connected with said states. In order to avoid a complicated calculation of the untreated particle emissions using a corresponding engine model during the operating conditions passed through by the internal combustion engine, provision is made for a default variable, which at least roughly correlates to the untreated particle emissions, to be used as the basis of evaluation for the course of the output signal 20. The temporal integral 30 versus the exhaust gas heat flow 60, i.e. the dissipated exhaust gas heat quantity 11, serves that purpose in the depicted example of embodiment.

The calibration of the system results from the determination of the course of the second output signal 20b of the particle sensor 44, the particle sensor 44 being disposed downstream of a particle filter, which is considered to be in a borderline condition according to the governmental requirements. As previously mentioned, it is advantageous for the calibration of the system to use a particle filter, which has somewhat less damage than one deemed borderline according to governmental standards. This is done here in order to assure a safety margin. The second output signal 20b is ascertained during a legally mandated driving cycle, respectively load/rpm cycle, of the internal combustion engine or of a motor vehicle powered by said internal combustion engine. At the same time, the temporal integral 30 versus the exhaust gas heat flow 60, i.e. the exhaust gas heat quantity 11, is formed as the default variable for the untreated particle emissions of the internal combustion engine.

If, as is the case at measurement point in time 22, the second output signal 20b achieves the minimum triggering threshold 13, the second limit value 14 is defined on the basis of the present value of the integral 30. The course of the integral 30 is therefore linked to the course of the output signal 30 of the particle sensor 44 for a borderline particle filter.

In order to diagnose the particle filter during the regular operation of the internal combustion engine, the integral 30, which has been formed since the beginning of the measurement cycle after the burning-free phase of the particle sensor 44, is compared with the output signal 20 at a predetermined point in time. Upon achieving the minimum triggering threshold 13, a check can then, for example, be made by means of the output signal 20 to determine whether the integral 30 has exceeded or not exceeded the second limit value 14. If the integral 30 has exceeded the second limit value 14 upon the minimum triggering threshold 13 being achieved, an intact particle filter is present. On the other hand, if the integral 30 still lies under the second limit value 14 upon the minimum triggering threshold 13 being achieved, a defective particle filter can be assumed because already more particles have arrived at the particle sensor 44 than is to be expected according to the integral 30, which correlates to the untreated particle emissions of the internal combustion engine.

FIG. 2 shows a flow diagram for diagnosing a particle filter according to an alternative evaluation. In a first block, the calculation of heat flow 40 is calculated using the input variables: ambient temperature 50, exhaust gas temperature 51 and exhaust gas volume flow 52 in the exhaust gas tract of the internal combustion engine, and said calculation is provided to an integral former 41. The integral former 41 forms the integral 30 as an integrated exhaust gas heat quantity by means of temporal integration of the exhaust gas heat flow 60 as an input variable for a first comparison junction 42. A check is made at the first comparison junction 42 to determine whether the integral 30 has exceeded the second limit value 14 shown in FIG. 1. If this is the case, the query is carried out at the second comparison junction 43 to determine whether the output signal 20 of the particle sensor 44, which has been provided to the second comparison junction 43, has exceeded the minimum triggering threshold 13 shown in FIG. 1. If the output signal 20 has not yet exceeded the minimum triggering threshold 13, an intact particle filter is present because not that many particles are collected on the particle filter as would be expected on the basis of the integral 30 for a borderline or defective particle filter. The item of information that the particle filter is intact is relayed forward to a block: particle filter OK 45. On the other hand, if the output signal 20 has exceeded the minimum triggering threshold 13, a defective particle filter can be assumed because more particles have now collected on the particle sensor 44 than is to be expected on the basis of the integral 30 as a default variable for the untreated particle emissions of the internal combustion engine for a borderline particle filter. A corresponding signaling is then carried out to a block: particle filter defective 46. Subsequent to the block: particle filter defective 46, further measures can now take place, for example a signaling to the operator of the internal combustion engine or an entry into an error memory.

According to a calibration of the system as is described with regard to FIG. 1, the functional capability of the particle filter after or during almost any operating parameters of the internal combustion engine can be determined on the basis of a comparison of the integral 30 of a default variable characterizing the untreated particle emissions of the internal combustion engine with the output signal 20 of the particle sensor 44.

Besides the previously described exhaust gas heat flow 60 as a default variable for the untreated particle emissions and the exhaust gas heat quantity 11 formed out of said flow 60 by means of temporal integration, a driven distance, which is ascertained from a driving speed or an oxygen quantity ascertained from an oxygen mass flow transferred during the combustion process or a fuel quantity ascertained from an injection quantity per unit of time or an amount of work performed ascertained from the power output of the internal combustion engine can alternatively be used as the temporal integral 30. Furthermore, it is possible to use the integral or the average/mean value of a variable dependent on the load or rotational speed of the internal combustion engine as the temporal integral 30.

Instead of using the minimum triggering threshold 13, every other point on the curve of the output signal 20 of the particle sensor 44 can furthermore be used as the comparison value to the corresponding value of the integral 30. The minimum triggering threshold 13 is, however, advantageous in that it is in direct contrast to the interferences on the output signal 20 and therefore makes a reliable and at the same time fast activation of the method possible.

The invention claimed is:

1. Method for diagnosing a particle filter used for filtering particles out of the exhaust gas of an internal combustion engine,
   wherein a collecting particle sensor is disposed downstream of the particle filter in the direction of flow of the exhaust gas, and
   wherein a measurement for the loading of the particle sensor is determined from an output signal of the particle sensor,
   wherein a temporal integral of a parameter correlating to the particle emissions of the internal combustion engine is formed during a measurement cycle,
      in that the measurement for the loading of the particle sensor is associated with the integral at least one measurement point in time during the measurement cycle, and
      in that a defective particle filter is suggested if the measurement for the loading of the particle sensor is higher than a loading threshold value associated with the integral or if the integral is lower than an integral threshold value associated with the measurement for the loading of the particle sensor.

2. The method according to claim 1, wherein the beginning of the measurement cycle is linked to a burning-free phase of the particle sensor.

3. The method according to claim 1, wherein a driven distance, which is ascertained from a driving speed, or an exhaust gas heat quantity ascertained from an exhaust gas heat flow or an oxygen quantity ascertained from an oxygen mass flow transferred during the combustion process or a fuel quantity ascertained from an injection quantity per unit of time or an amount of work performed ascertained from the power output of the internal combustion engine is used as the temporal integral; or in that the integral or the average/mean value of a variable dependent on the load or rotational speed of the internal combustion engine is used as the temporal integral; or in that at least two integrals from at least two of the aforementioned variables are used for diagnosing the particle filter.

4. The method according to claim 1, wherein a defective particle filter is suggested if a defective particle filter was diagnosed in at least two consecutive measurement cycles.

5. The method according to claim 1, wherein a first ratio is formed from the measurement for the loading of the particle sensor and the integral of the parameter and in that a defective particle filter is suggested when a first ratio threshold is exceeded or in that a second ratio is formed from the integral of the parameter and the measurement for the loading of the particle sensor and in that a defective particle filter is suggested when a second ratio threshold is undershot.

6. The method according to claim 5, wherein the establishment of the loading threshold value or the integral threshold value or the first ratio threshold or the second ratio threshold takes place during the operation of an internal combustion engine with a borderline particle filter.

7. The method according to claim 1, wherein the measurement point in time is defined for associating the measurement for the loading of the particle sensor with the integral if the measurement for the loading of the particle sensor achieves a predetermined first limit value or if the integral achieves a predetermined second limit value.

8. The method according to claim 7, wherein the first limit value is defined at a value, whereat an output signal of the collecting particle sensor achieves a minimum triggering threshold of the particle sensor.

9. The method according to 7, wherein the second limit value is defined at a value, whereat a sufficient quantity of particles for the evaluation of the particle sensor is collected on the particle sensor when the particle filter is in a borderline condition.

10. The method according to claim 7, wherein the second limit value is defined at a value, whereat the minimum triggering threshold of the particle sensor is achieved when the particle filter is in a borderline condition.

11. Device for diagnosing a particle filter used to filter particles from the exhaust gas of an internal combustion engine having-comprising:
    a collecting particle sensor, which is disposed downstream of the particle filter in the direction of flow of the exhaust gas; and
    control electronics for evaluating an output signal of the particle sensor and for forming a measurement for the loading of the particle sensor from the output signal of the particle sensor,
    wherein a provision is made in the control electronics for an integral former for forming a temporal integral of a parameter correlating to the particle emissions of the internal combustion engine,
    in that provision is made in the control electronics for software for comparing the measurement for the loading of the particle filter with a loading threshold value defined as a function of a present integral or in that provision is made in the control electronics for software for comparing the present integral with an integral threshold value defined as a function of the measurement for the loading of the particle filter.

12. The device according to claim 11, wherein a driving speed or an exhaust gas heat flow or an oxygen heat flow momentarily transferred due to the combustion process or a fuel quantity injected per unit of time or a power output yielded by the internal combustion engine or a variable dependent on the load and the rotational speed of the internal combustion engine is supplied to the control electronics for the formation of the integral.

* * * * *

UNITED STATES PATENT AND TRADEMARK OFFICE
CERTIFICATE OF CORRECTION

| | | |
|---|---|---|
| PATENT NO. | : 8,327,696 B2 | Page 1 of 1 |
| APPLICATION NO. | : 12/689582 | |
| DATED | : December 11, 2012 | |
| INVENTOR(S) | : Baars et al. | |

It is certified that error appears in the above-identified patent and that said Letters Patent is hereby corrected as shown below:

In the Claims

Col. 9, line 16, claim 1: "integral at least one" should read --integral at at least one--

Col. 10, line 25, claim 11: "engine having-comprising:" should read --engine comprising:--

Signed and Sealed this
Sixteenth Day of July, 2013

Teresa Stanek Rea
*Acting Director of the United States Patent and Trademark Office*